Sept. 7, 1926.                    C. E. HARTSOOK                    1,599,049
                                  SEED CORN HANGER
                                 Filed Jan. 28, 1925

Inventor
C. E. Hartsook.
By
Lacey & Lacey, Attorneys

Patented Sept. 7, 1926.

1,599,049

UNITED STATES PATENT OFFICE.

CHARLES E. HARTSOOK, OF MAQUON, ILLINOIS.

SEED-CORN HANGER.

Application filed January 28, 1925. Serial No. 5,385.

This invention relates to means for storing seed corn and has for its object the provision of an inexpensive device by the use of which a large quantity of corn may be stored in a warehouse and supported in such a manner as to permit a free circulation of air through and around the stored corn as well as to retain the corn in such position that accidental dislodgment thereof is not apt to occur. The invention is illustrated in the accompanying drawing and will be hereinafter fully set forth.

Figure 1:
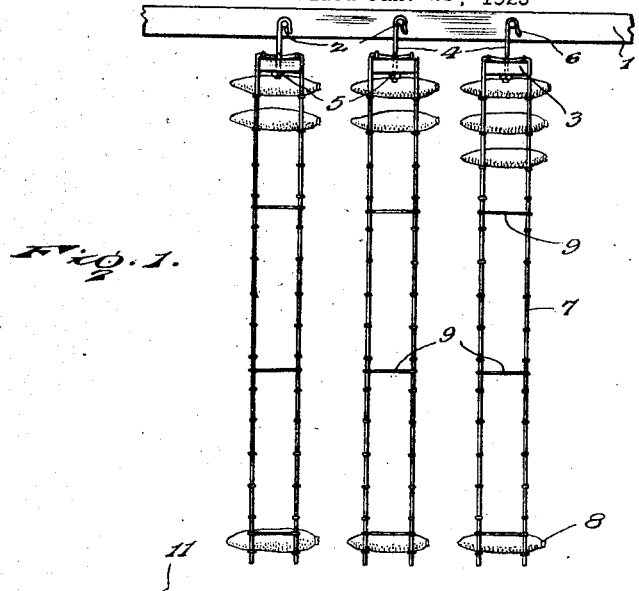
Figure 1 is a view in end elevation of a series of my seed corn racks.
Figure 2:
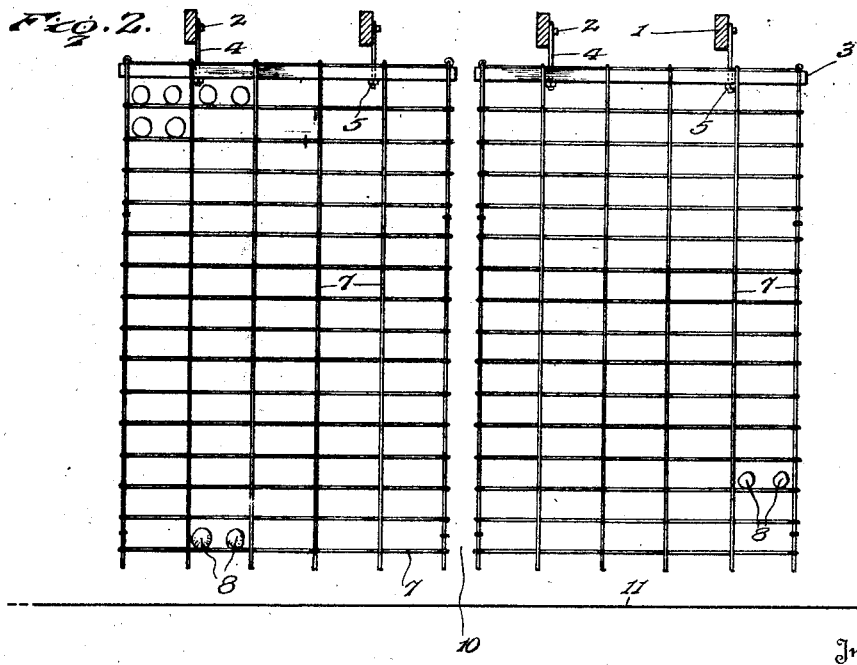
Fig. 2 is a side elevation of the same.

In the drawing, the reference numeral 1 indicates rafters or beams which constitute a part of the roof of the warehouse or may be secured at points below the roof. These rafters or beams are, of course, in spaced parallel relation, as shown most clearly in Fig. 2, and extend from side to side or from end to end of the warehouse in an obvious manner. In carrying out my invention, I secure in the beams or rafters at regular intervals studs or pins 2 upon which the racks for supporting the ears of corn are to be suspended. In constructing the racks, I employ a head bar 3 which is preferably a wooden bar of suitable dimensions and at intervals through the said bar I mount hooks 4 having threaded stems upon which are fitted nuts 5 adapted to be turned home against the under side of the bar 3. The bills of these hooks are engaged over the pins or projections 2, as shown at 6, and it will be readily understood that by properly adjusting the nuts 5 the several hooks may be so disposed that the bar 3 will be supported in a horizontal plane. I also employ sheets or lengths of woven wire fabric 7, the meshes of which are coarse enough to each receive two ears of corn, as indicated at 8. This sheet or length of woven wire fabric is doubled upon itself at its center, and the doubled central portion is then engaged over the head bar 3, as clearly shown in the drawing, the meshes in the two sides of the fabric being disposed in strict alinement so that the ears of corn will rest horizontally therein. At intervals in the height of the rack thus formed, I provide tie wires 9 which are attached to and extend between the vertical strands of the racks so as to maintain the two sides thereof in the proper vertical parallel relation.

The racks are hung upon the projections 2 so that they will be suspended in rows or columns whereby passages between adjacent rows or columns will be provided to permit the movement of attendants about and between the several racks to inspect the corn or to remove portions thereof for use or sale. The racks are also of such dimensions that the alined racks will be spaced apart at their ends, as indicated at 10, and it will also be noted that the lower ends of the racks are spaced above the floor, indicated at 11, whereby there will be ample room provided for the movement of animals which may stray into the barn without causing any disturbance of the racks or the corn supported therein. It will also be noted that the ears of corn may be very easily placed in the racks or removed therefrom but at the same time they will be firmly supported in the racks and a free circulation of air will be provided around and through the several racks so that thorough ventilation will be accomplished and deterioration of the corn will be avoided.

Having thus described the invention, I claim:—

1. A seed corn hanger comprising a head bar, seed corn supporting members consisting of wire fabric suspended from the head bar and transversely spaced thereby, and suspending means at intervals in the length of the head bar.

2. A seed corn hanger comprising a head bar, seed corn supporting members consisting of wire fabric attached to the head bar and extending along the outer edges thereof, means acting jointly with the head bar to connect and space the said members, and suspending means at intervals in the length of the head bar.

3. A seed corn hanger comprising open-mesh members, a head bar upon which said members are mounted to depend therefrom in parallel relation, and adjustable means for suspending said head bar within a building and disposing the same in a horizontal plane.

4. A seed corn hanger comprising a head bar, hooks fitted through said head bar to suspend the same within a building and provided with threaded stems, adjusting nuts mounted on said stems below the head bar to be turned home against the same and dispose it in a horizontal plane, and open-mesh members suspended from said bar at the opposite side edges of the same with their meshes in alinement to receive and hold ears of corn.

5. A seed corn hanger comprising a head bar, an open-mesh fabric doubled upon itself and engaged over said head bar at its doubled portion whereby to present parallel members depending from the opposite side edges of the bar with their meshes in alinement to receive and support ears of corn, and suspending hooks fitted adjustably through the head bar whereby to suspend the same within a building in a horizontal plane.

In testimony whereof I affix my signature.

CHARLES E. HARTSOOK. [L. S.]